Patented July 24, 1934

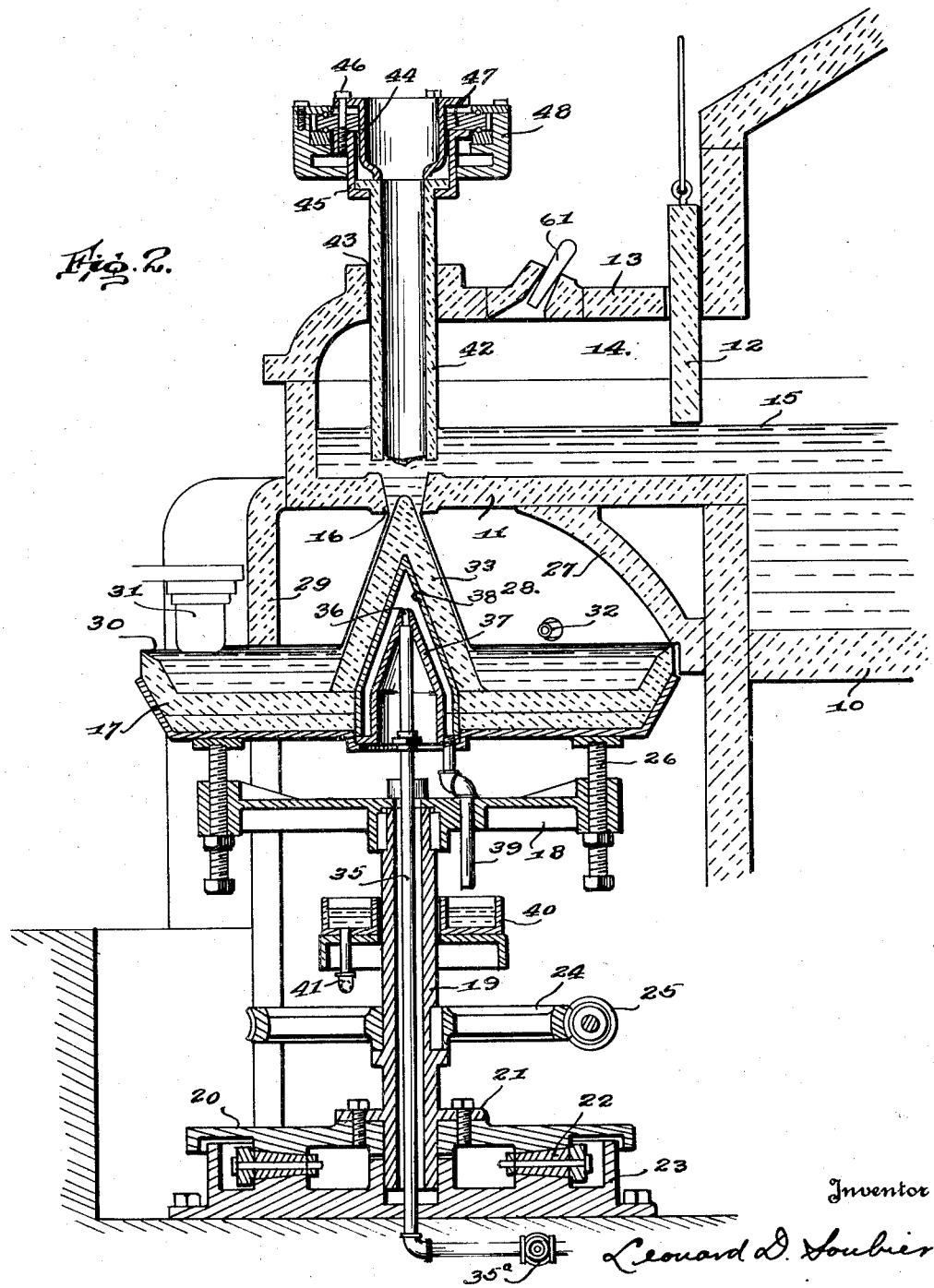

1,967,378

UNITED STATES PATENT OFFICE 1,967,378

APPARATUS FOR FLOWING AND DISTRIBUTING MOLTEN GLASS

Leonard D. Soubier, Woonsocket, R. I., assignor to Owens-Illinois Glass Company, a corporation of Ohio Application March 22, 1932, Serial No. 600,421

16 Claims. (Cl. 49—56)

My invention relates to apparatus for supplying molten glass to a gathering pot or tank.

In United States patent to August Kadow, Number 1,815,258, July 21, 1931, there is disclosed an apparatus including a rotating tank from which glass may be gathered, said tank comprising a central conical projection onto which a stream of glass is caused to flow and by which the glass is distributed within the tank, means also being provided for regulating and controlling the temperature of the glass. The present invention is embodied in a construction similar to that above noted in reference to the Kadow patent, and comprises various improvements over the disclosure in said patent.

An object of my invention is to provide in an apparatus of the character indicated, improved means for uniformly distributing the glass, for adjustably regulating the rate of flow, and for controlling the temperature of the glass.

Other objects of the invention will appear hereinafter.

In the accompanying drawings:

Fig. 2 is a sectional side elevation of such apparatus.

Figure 1:
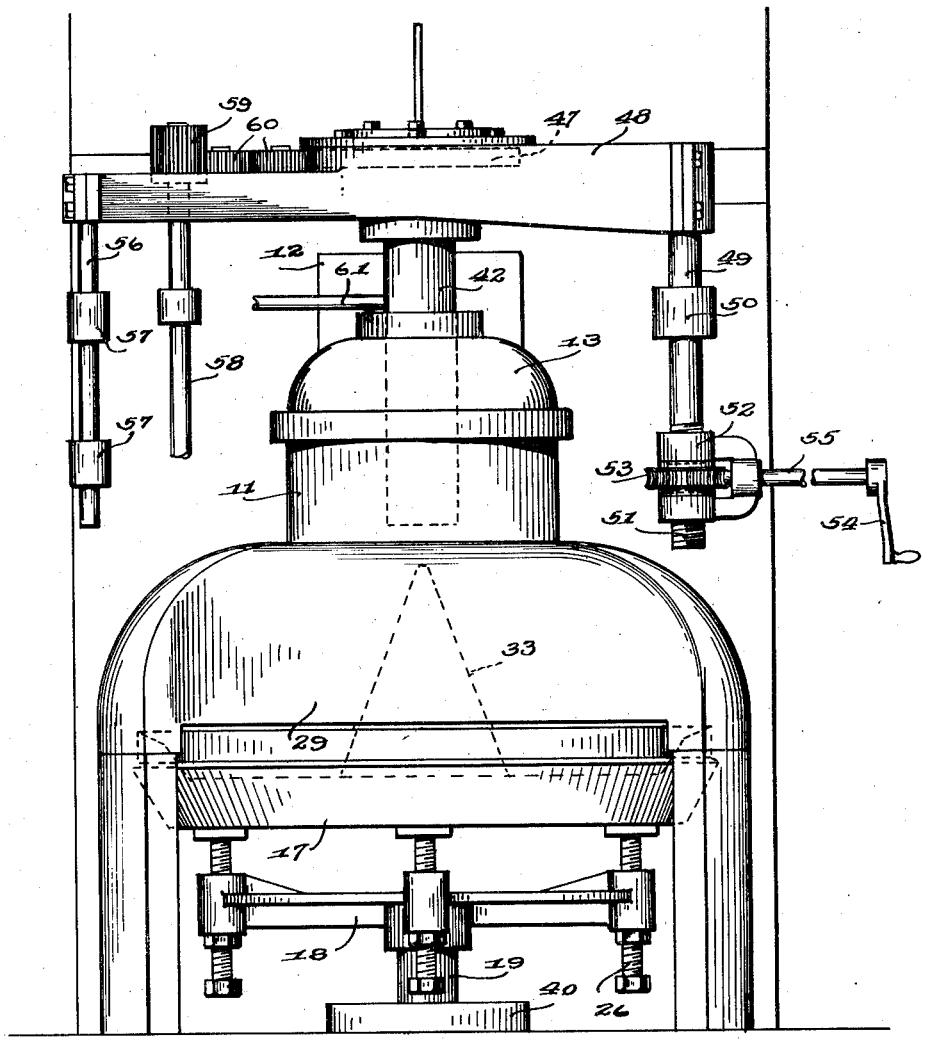
Fig. 1 is a front elevation view of an apparatus constructed in accordance with the principles of my invention.

The main furnace tank 10 is provided with a forehearth extension 11 which may be of usual construction. A gate 12 extends downward through an opening in the roof 13 of the forehearth and provides a partition between the combustion chamber of the main furnace and the chamber 14 within the forehearth, said gate being adjustable toward and from the molten glass 15 to regulate the flow of gases between said chambers. The floor of the forehearth is provided with a bottom outlet opening 16 extending therethrough, through which molten glass may flow continuously into a gathering pot or tank 17 located therebeneath.

The gathering pot is mounted for continuous rotation about a vertical axis and for this purpose is supported on a disk or spider 18 mounted on the upper end of a hollow drive shaft 19, the spider being keyed to said shaft to rotate therewith. A bearing plate 20 is bolted to a bracket or flange 21 which may be cast integral with the shaft 19. Said bearing plate is mounted on roller bearings 22 on a base plate 23. A worm wheel 24 keyed to the shaft 19 is driven by a worm gear 25 connected to any suitable source of power for rotating the tank 17. The gathering pot is supported on adjusting screws 26 threaded in the spider 18, permitting vertical adjustment and leveling of the pot.

The pot 17 is partially surrounded and enclosed by a roof formed in part by the floor of the forehearth 11 and also including an inclined wall 27 which may form part of the supporting structure for the forehearth. There is thus provided a heat regulating chamber 28 over the glass in the tank. A vertical wall or jack arch 29 forming part of the enclosing wall of said chamber 28, provides the usual exposed gathering area 30 from which glass may be withdrawn as by means of molds 31 of a suction gathering machine.

Heat regulating devices 32 regulate and control the temperature within the chamber 28. These may consist of burners, where it is desired to apply heat to the glass in the revolving pot.

Within the chamber 28 is a refractory cone 33 which rotates with the pot 17 and may form a part thereof. This cone is arranged concentrically with the axis of rotation of the pot and, as shown, rises from the floor of the pot. The tip of the cone may project upward into the outlet 16, thus providing an annular space between the walls of the outlet and the cone, through which space the glass flows in an annular sheet or stream onto the cone adjacent its apex. The rotation of the cone assists in causing the glass to be spread evenly over the entire surface of the cone. The glass flowing down the walls of the cone is thus uniformly distributed around the base of the cone as it enters and unites with the supply body of glass within the pot. If desired, the rate of flow of the glass may be adjustably regulated by adjusting the pot up and down by means of the adjusting screws 26. Other means for adjusting the rate of flow are also provided, as hereinafter pointed out.

The temperature of the interior surface of the cone 33 is regulated by suitable means for the purpose of exhausting heat from or supplying heat to the glass as it flows downward over the cone. Such means may comprise a pipe 35 extending upward through the hollow shaft 19 into the cone 33. A cooling medium such as air or water is supplied through the pipe 35 and issues from the nozzle 36 at the upper end of the pipe and is distributed over the interior surface of the cone. This distribution may be assisted by a conical-shaped distributor 37 surrounding the pipe 35 and forming with the inner surface of the cone 33 a narrow passageway through which the cooling medium flows downward to a discharge pipe 39. If water is used as the cooling medium it is discharged from the pipe 39 into a stationary annular trough 40 surrounding the shaft 19 and from thence is discharged through a waste pipe 41. The interior surface of the cone 33 may be provided with a lining 38 of cast iron or other suitable protecting material. When it is desired to supply heat to the interior of the cone, the nozzle 36 may serve as a burner for fuel gases supplied through the pipe 35. A valve 35ª permits regulation or shutting off of the flow through the pipe 35.

An implement for controlling the rate of flow of the glass through the outlet 16 and also serving to equalize the temperature of the glass is herein shown as a tube 42 of refractory material projecting downward through an opening 43 in the roof of the forehearth concentric with the outlet 16 and axis of rotation of the pot, the lower end of said tube projecting into the glass over the outlet 16. The upper end of the tube is attached to a metal head including inner and outer clamping members 44 and 45, respectively, which are clamped to the tube by means of screw bolts 46. An annular gear 47 is attached to said head by means of the bolts 46. Said gear has a bearing within an arm 48 which extends transversely of the forehearth and provides a support for the implement 42.

A vertical shaft 49 at one end of the arm 48, extends downward through a stationary bearing 50 and a stationary yoke 52. The lower portion 51 of the shaft is screw threaded and has threaded thereon a worm gear 53 supported in the yoke 52. A hand crank 54 is attached to a worm shaft 55 comprising a worm running in mesh with the gear 53. By rotating the crank 54, the shaft 49 may be adjusted up or down, carrying with it the arm 48 and implement 42. At the opposite end of the arm 48 is fixed a vertical shaft 56 which extends downward through stationary bearings 57.

The tube 42 is rotated, preferably continuously, by means of a drive shaft 58 connected to any suitable source of power (not shown). Said shaft carries at its upper end a pinion 59 which transmits motion through a train of gears 60 to the gear 47. The gears 60 as well as the gear 47 are mounted on the arm 48, the pinion 59 being of sufficient depth to permit vertical adjustment of said gears relative to said pinion. The continuous rotation of the implement 42 serves to stir the glass and, if desired, may be of a speed to control to a certain extent the rate of flow through the outlet 16. The rate of flow through said outlet may be accurately adjusted and controlled by adjusting the arm 48 up and down by means of the hand crank 54. A burner or burners 61 provide means for heating and regulating the temperature of the glass within the forehearth. The burner, as shown, is preferably arranged to direct a flame toward the area of glass surrounding the implement 42.

Modifications may be resorted to within the spirit and scope of my invention.

What I claim is:

1. The combination of a pot rotatable about a vertical axis, a conical distributor extending above the pot concentric with said axis, means forming with said distributor an annular passageway concentric with said axis and surrounding a portion of the distributor, and means for flowing molten glass through said passageway.

2. The combination of a pot rotatable about a vertical axis, a distributor for molten glass providing an annular surface above the glass in the pot, means forming with said distributor an annular passageway, and means for supplying molten glass and causing it to flow through said passageway onto said annular surface and over said surface into the pot.

3. The combination of a pot rotatable about a vertical axis, a distributor for molten glass providing an annular surface above the glass in the pot, means forming with said distributor an annular passageway, means for supplying molten glass and causing it to flow through said passageway onto said annular surface and over said surface into the pot, and means for rotating said pot and distributor about said axis.

4. The combination of a container for molten glass having a bottom outlet opening, a pot beneath said opening, a distributor interposed between the pot and said opening and forming with the walls of the opening an annular passageway through which the glass flows by gravity from said container onto the distributor, and means for rotating the distributor.

5. The combination of a container for molten glass having a bottom outlet opening, a pot beneath said opening, a distributor interposed between the pot and said opening and forming with the walls of the opening an annular passageway through which the glass flows by gravity from said container onto the distributor, means for rotating the distributor, and means for regulating and controlling the temperature of said distributor and thereby regulating the temperature of the glass flowing thereover into the pot.

6. The combination of a pot rotatable about a vertical axis, a distributor rotatable with the pot and projecting upward above the glass therein, said distributor shaped and positioned to provide an annular distributing surface concentric with said axis, means providing with said surface an annular passageway, and means for flowing glass through said passageway onto said distributing surface.

7. The combination of a container for molten glass having a bottom outlet through which the glass is discharged by gravity, a pot beneath said outlet, means for rotating the pot about a vertical axis extending through said outlet, and a distributor extending upward from the floor of the pot and rotating therewith, said distributor having an exterior conical surface concentric with said axis and projecting into said outlet and forming therewith an annular passageway through which molten glass flows onto the distributor.

8. The combination of a container for molten glass having a bottom outlet through which the glass is discharged by gravity, a pot beneath said outlet, means for rotating the pot about a vertical axis extending through said outlet, a distributor extending upward from the floor of the pot and rotating therewith, said distributor having an exterior conical surface concentric with said axis and projecting into said outlet and forming therewith an annular passageway through which molten glass flows onto the distributor, and means for adjusting the size of said passageway and thereby adjustably regulating the rate of flow of glass.

9. The combination of a pot to contain molten glass, means to rotate the pot about a vertical axis, means providing an annular passageway above the pot and concentric with said axis, means for flowing molten glass through said passageway, and a conical distributor interposed between said passageway and the pot and providing a conical surface over which the glass flows by gravity into the pot.

10. The combination of a container for molten glass having a bottom outlet, a pot beneath said outlet, means for rotating the pot about a vertical axis concentric with said outlet, a conical distributor interposed between the pot and the outlet, an implement projecting downward into the glass in said container, means for rotating said implement about said axis, and means for adjusting said implement vertically and thereby regulating the rate of flow of glass through said outlet.

11. The combination of a container for molten glass having a bottom outlet, a pot beneath said outlet, means for rotating the pot about a vertical axis concentric with said outlet, a conical distributor interposed between the pot and the outlet, a tubular implement projecting downward into said container concentric with said outlet, and means for adjusting said implement vertically and thereby adjusting the rate of flow of glass through the outlet.

12. The combination of a glass furnace tank, a forehearth extension on the tank having a bottom outlet opening, a pot beneath said outlet, means for rotating the pot about a vertical axis concentric wih said outlet, and a distributor rising from the floor of the pot and having an exterior conical distributing surface over the glass in the pot, the apex of said distributor projecting upward into said outlet opening and forming with the walls of the outlet an annular passageway through which glass flows by gravity onto said distributing surface.

13. The combination of a glass furnace tank, a forehearth extension on the tank having a bottom outlet opening, a pot beneath said outlet, means for rotating the pot about a vertical axis concentric with said outlet, a distributor rising from the floor of the pot and having an exterior conical distributing surface above the glass in the pot, a tubular implement projecting downward into the glass over the outlet and arranged concentrically with said axis, means for rotating said implement about said axis, the lower end of said implement being spaced upwardly from the floor of the forehearth and providing a restricted annular passageway through which the glass flows and enters said outlet, and means for adjusting said implement vertically and thereby regulating the size of said restricted passageway to regulate the rate of flow of glass therethrough.

14. The combination of a container for molten glass having a bottom outlet opening, a distributor supported beneath the container and projecting upwardly from its support with its upper end free and forming with the walls of said opening an annular passageway through which the glass flows by gravity from the container onto the distributor, and automatic means for rotating said distributor.

15. The combination of a container for molten glass having a bottom outlet opening, a distributor supported beneath the container and projecting upwardly from its support with its upper end free and forming with the walls of said opening an annular passageway through which the glass flows by gravity from the container onto the distributor, means for continuously rotating the distributor about a vertical axis, and means for adjusting the distributor toward and from the outlet opening and thereby adjustably varying the size of said opening.

16. The combination of a container for molten glass having a bottom outlet opening, a conical distributor supported beneath said container and positioned with its axis vertical and its apex projecting upward into the opening and forming with the walls of the opening an annular passageway through which the glass issues, and means for rotating said distributor about its axis for distribution of the glass over the conical surface of the distributor.

LEONARD D. SOUBIER.